United States Patent [19]

Sereg

[11] 3,992,987

[45] Nov. 23, 1976

[54] BELT GUIDE ROLLER FOR BALERS

[76] Inventor: Joseph F. Sereg, Box 156, Rte. No. 2, Eddyville, Iowa 52553

[22] Filed: Aug. 25, 1975

[21] Appl. No.: 607,296

[52] U.S. Cl. .................................. 100/88; 56/341; 198/813; 198/837; 74/242.1 TA
[51] Int. Cl.² ............................................. B30B 5/06
[58] Field of Search .................... 100/5, 76, 88, 90; 198/208, 202, 190; 56/341–343; 74/226, 241.1 R, 242.1 TA, 242.1 A, 240

[56] References Cited
UNITED STATES PATENTS

| | | | |
|---|---|---|---|
| 2,297,573 | 9/1942 | MacDonald et al. | 198/208 X |
| 2,627,223 | 2/1953 | Berge | 100/88 X |
| 2,795,254 | 6/1957 | Hill | 74/242.1 R X |
| 3,895,573 | 7/1975 | Phillips et al. | 56/341 |

Primary Examiner—Peter Feldman
Attorney, Agent, or Firm—Zarley, McKee, Thomte, Voorhees & Sease

[57] ABSTRACT

A belt guide roller for a baler having a wheeled frame with front, top, rear and bottom portions. A plurality of spaced apart driven belts extend around the frame and are designed to roll the hay into a large cylindrical bale in conventional fashion. The belt guide roller is rotatably mounted on the lower forward portion of the frame means and exerts pressure against the driven belts. The belt guide roller has a plurality of spaced apart annular guide members mounted thereon which extend between the driven belts to keep the driven belts from laterally shifting. The pressure which is exerted against the driven belts permits the driven belts to engage a greater portion of the periphery of the drive roller on the frame means thereby decreasing belt slippage.

2 Claims, 4 Drawing Figures

BELT GUIDE ROLLER FOR BALERS

BACKGROUND OF THE INVENTION

This invention relates to a hay baler and more particularly to a belt guide roller for a baler.

Hay baling machines are now being used to create extremely large cylindrical bales. One such machine is manufactured by Vermeer Manufacturing Company, Pella, Iowa. In such machines, the hay passes through compression rollers and is folded onto itself by a plurality of belts so that very large cylindrical bales are formed. The belts on the baler at the lower forward portion thereof tend to slide laterally if the bale being formed therein is uneven. This uneven configuration is often caused by variations in windrows and a lack of uniformity in the manner in which the hay passes into the unit.

Therefore, it is the principal object of the invention to provide a belt guide roller for a baler.

A further object of the invention is to provide a belt guide roller for a baler which prevents lateral shifting of the belts at the lower forward end of the baler.

A further object of the invention is to provide a belt guide roller for a baler which exerts pressure against the belts so that the belts engage a greater portion of the periphery of the immediately adjacent drive roller.

A still further object of the invention is to provide a belt guide roller for a baler which may be easily mounted on the existing balers without substantial alteration thereof.

A still further object of the invention is to provide a belt guide roller for a baler which is economical to manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
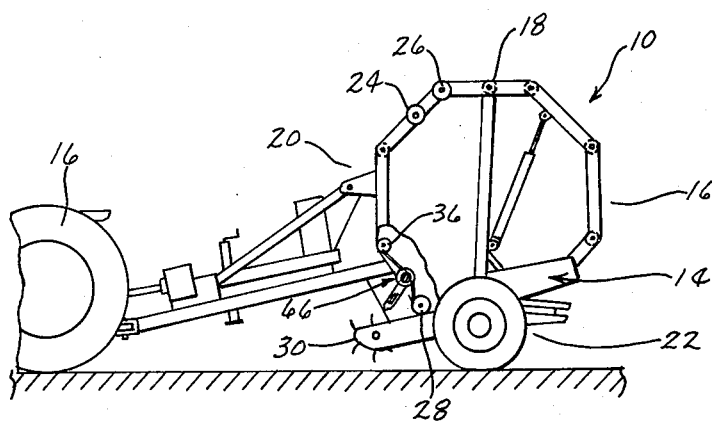
FIG. 1 is a side view of a baler having the device of this invention mounted thereon.

Referring now to the drawings, the numeral 10 designates a hay baler capable of producing large cylindrical bales 12 in conventional fashion. Vermeer Manufacturing Company of Pella, Iowa manufactures such a baler and it is designated as Model 605C. Baler 10 includes a wheeled frame means 14 which is adapted to be pulled through the field by a prime mover such as a tractor 16 or the like.

Figure 2:
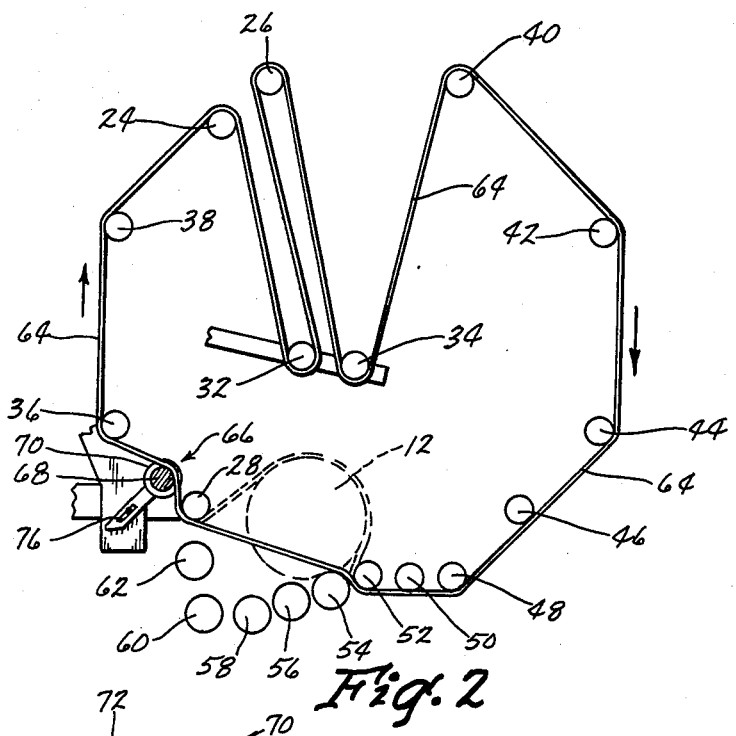
FIG. 2 is a schematic view illustrating the relationship of the device of this invention and the driven belts.
Figure 3:
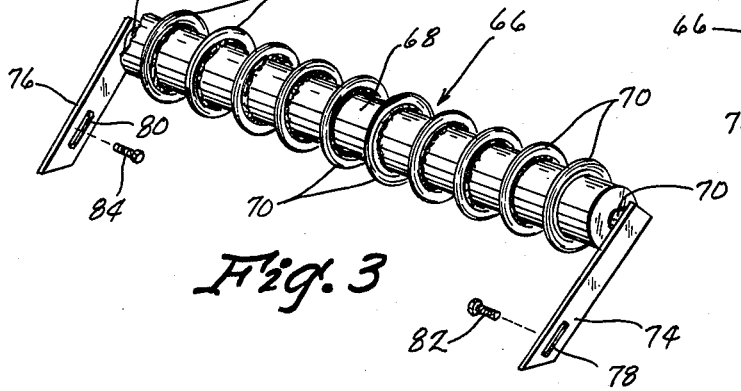
FIG. 3 is a perspective view of the belt guide roller of this invention.

For purposes of description, frame means 14 will be described as having rear, top, front and bottom portions 16, 18, 20 and 22 respectively. Frame means 14 has drive rollers 24 and 26 mounted at the upper forward end thereof and drive roller 28 at the lower forward end which is positioned adjacent the pick-up apparatus referred to generally by the reference numeral 30. A pair of belt tightener rollers 32 and 34 are mounted on the frame means as are idler rollers 36, 38, 40, 42, 44, 46, 48, 50 and 52. The numerals 54, 56 and 58 refer generally to belt support rollers. The numeral 60 refers to a drive roller while the numeral 62 designates a compression roller. A plurality of spaced apart driven belts 64 extend around the various rollers as illustrated in FIG. 2 and are driven in conventional fashion to form the bale 12.

Heretofore, the belts 64 adjacent the drive roller 28 would tend to move laterally if the bale being formed was uneven. Such an uneven configuration is often caused by variations in windrows and a lack of uniformity in the manner in which the hay goes into the unit. The belt guide roller of this invention is referred to generally by the reference numeral 66 and is designed to prevent the belts 64 from shifting laterally and to cause the belts 64 to engage a greater portion of the periphery of the drive roller 28. Belt guide roller 66 generally comprises roller 68 having a plurality of spaced apart annular guide members 70 mounted thereon for rotation therewith. Collars 70 and 72 are mounted on the opposite ends of the roller 68 and have mounting bars or brackets 74 and 76 secured thereto and extending therefrom. Bars 74 and 76 are provided with elongated slots 78 and 80 formed therein respectively adapted to receive belts 82 and 84 extending therethrough to permit the bars 74 and 76 to be adjustably secured to the frame means such as illustrated in FIG. 2.

Figure 4:
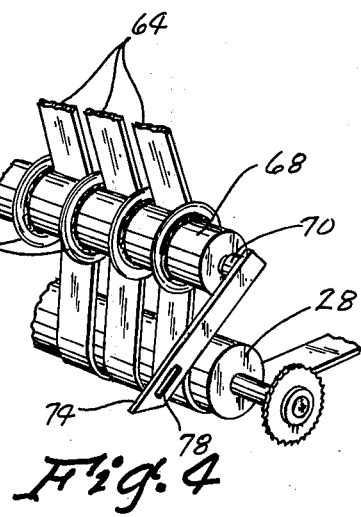
FIG. 4 is a partial perspective view illustrating the relationship of the belt guide roller and the belts and driven roller.

The belt guide roller 66 is secured to the frame means 14 adjacent the lower forward portion thereof as illustrated in the drawings. As seen in FIGS. 2 and 4, the belt guide roller 66 is positioned adjacent the drive roller 28 which is located at the lower forward portion of the machine. The bars 74 and 76 are adjustably mounted on the frame means so that the roller 68 exerts pressure against the belt 64 thereby causing the belt 64 to engage a greater portion of the periphery of the drive roller 28 than is customary. The pressure which is exerted against the belts permits the belts to engage a greater portion of the periphery of the drive roller thereby decreasing belt slippage and making the drive roller 28 more efficient. The guide members 70 are received between the adjacent belt 64 as illustrated in FIG. 4 and prevent the belt 64 from shifting laterally.

Thus it can be seen that a belt guide roller has been provided for a baler which not only increases the efficiency of the drive roller at the lower forward portion of the baler but which also prevents the belts from shifting laterally at the lower forward portion of the baler.

The belt guide roller of this invention is easily installed on conventional balers without extensive modification thereof. Thus it can be seen that the device of this invention accomplishes at least all of the stated objectives.

I claim:

1. In combination,
   a baler including a frame means having front, top, back and bottom portions,
   a plurality of spaced-apart belts extending around said frame means,
   a belt drive roller mounted on said frame adjacent its lower forward end, a belt guide roller means mounted on said frame means at the lower forward end thereof adjacent said drive roller, said belt guide roller means comprising an elongated continuous roller of constant diameter engaging said belts, and said belt guide roller means being adjustably mounted on said frame means for permitting said roller means to be selectively rigidly secured to said frame means to permit the pressure on said belts to be selectively adjusted, said frame having a bale forming portion adjacent one side of said drive roller, and said belt guide roller being located on the other side of said drive roller opposite to said bale forming portion, and being positioned above and forwardly of said drive roller, a plurality of spaced-apart annular guide members rigidly secured to said roller and being positioned between adjacent belts.

2. The combination of claim 1 wherein said belt guide roller means is freely rotatably mounted on said frame means.

* * * * *